US 6,710,758 B2

(12) United States Patent
Caracci et al.

(10) Patent No.: US 6,710,758 B2
(45) Date of Patent: Mar. 23, 2004

(54) SPATIAL LIGHT MODULATORS WITH IMPROVED INTER-PIXEL PERFORMANCE

(75) Inventors: Lisa A. Caracci, Corning, NY (US); John P. Kondis, Costa Mesa, CA (US); Robert G. Lindquist, Elmira, NY (US); Rui-Qing Ma, Painted Post, NY (US); Carina R. Reisin, Irvine, CA (US); Bradley A. Scott, Silverado, CA (US)

(73) Assignee: Corning Incorporated, Corning, NY (US)

( * ) Notice: Subject to any disclaimer, the term of this patent is extended or adjusted under 35 U.S.C. 154(b) by 23 days.

(21) Appl. No.: 10/328,128

(22) Filed: Dec. 19, 2002

(65) Prior Publication Data
US 2003/0128416 A1 Jul. 10, 2003

Related U.S. Application Data
(60) Provisional application No. 60/342,629, filed on Dec. 20, 2001.

(51) Int. Cl.$^7$ .................... G09G 3/34; G02F 1/1335; G02F 1/29
(52) U.S. Cl. .................. 345/84; 345/38; 345/50; 345/206; 349/114; 359/318; 359/320
(58) Field of Search ................... 345/206, 211, 345/694, 33, 38, 50, 1.2, 55, 87; 349/33, 113, 114; 359/315–320

(56) References Cited

U.S. PATENT DOCUMENTS

| | | | | |
|---|---|---|---|---|
| 5,221,989 A | * | 6/1993 | Stappaerts et al. | 359/323 |
| 5,384,649 A | | 1/1995 | Takimoto et al. | 349/25 |
| 5,453,860 A | * | 9/1995 | Akiyama et al. | 349/28 |
| 5,706,067 A | | 1/1998 | Colgan et al. | 349/114 |
| 5,764,329 A | * | 6/1998 | Chen et al. | 349/193 |
| 5,868,951 A | | 2/1999 | Schuck, III et al. | 216/24 |
| 6,021,223 A | * | 2/2000 | Toyoda et al. | 382/214 |
| 6,175,442 B1 | | 1/2001 | Booth, Jr. et al. | 359/290 |
| 6,327,013 B1 | * | 12/2001 | Tombling et al. | 349/139 |
| 6,351,327 B1 | * | 2/2002 | Walsh | 359/259 |
| 2001/0050787 A1 | * | 12/2001 | Crossland et al. | 359/15 |

* cited by examiner

Primary Examiner—Evelyn A. Lester
(74) Attorney, Agent, or Firm—George V. Bean

(57) ABSTRACT

A reflective spatial light modulator (SLM) includes a first substrate, a second substrate and an electro-optic material positioned between the first and second substrates. The first substrate includes a reflective ground layer that acts as a continuous first electrode and the second substrate includes a pixel layer having a plurality of pixel elements formed in a pattern. The pixel elements are formed of a transparent conductive material and are separated by inter-pixel regions formed of a non-conductive material. A transmissivity of the electro-optic material in a vicinity of each of the plurality of pixel elements is controlled by a potential difference applied between the first electrode and a respective one of the pixel elements.

27 Claims, 8 Drawing Sheets

SPATIAL LIGHT MODULATORS WITH IMPROVED INTER-PIXEL PERFORMANCE

CROSS-REFERENCE TO RELATED APPLICATION

This application claims the benefit of U.S. Provisional Patent Application Serial No. 60/342,629, filed Dec. 20, 2001, now abandoned, the entire disclosure of which is hereby incorporated herein by reference.

BACKGROUND OF THE INVENTION

1. Field of the Invention

The present invention is directed to a spatial light modulator and, more specifically, to a spatial light modulator with improved inter-pixel performance.

2. Technical Background

Reflective liquid crystal (LC) spatial light modulators (SLMs) have been constructed with spatially distributed discrete pixels in one or more dimensions. FIG. 1 depicts a partial cross-section of a typical prior art SLM 100, absent a number of common barrier layers, such as silicon nitride (SiN) and silicon dioxide ($SiO_2$), which are well known and not particularly relevant to the present discussion and therefore are not illustrated. As is shown in FIG. 1, the SLM 100 includes a transparent first substrate 102, which includes a continuous optically transparent first electrode 106, formed on an upper surface of the substrate 102, that serves as a ground electrode. A top and second substrate 104 includes a pixel layer 108 formed on a lower surface, which includes a number of discrete conductive pixel elements 108A, 108B and 108C. A transparent alignment layer 112 is formed over the layer 108 and a transparent alignment layer 116 is formed over the first electrode 106. The alignment layers 112 and 116 may be made of a polyamide and are used to align LC molecules of electro-optic material 114.

The pixel elements 108A–108C also function as mirrors and act to reflect an incoming light beam that travels through the electro-optic material 114, e.g., a liquid crystal (LC) film, interposed between the layer 108 and the electrode 106, when a potential difference applied between one of the pixel elements 108A–108C and the first electrode 106 is such that the electro-optic material 114 in the area of at least one of the pixel elements 108A–108C is transmissive.

The pixel element 108A is separated from the pixel element 108B by an inter-pixel region 110A and the pixel element 108B is separated from the pixel element 108C by an inter-pixel region 110B. With reference to a center of the pixel element 108B, it will be appreciated that due to electrical field fringing and the absence of an electrode material, the optical properties (e.g., insertion loss) of the inter-pixel regions 110A and 110B will differ from that of the center of the pixel element 108B. FIG. 2 depicts a graph illustrating a typical insertion loss associated with the SLM 100 of FIG. 1. As shown in FIG. 2, the insertion loss attains a maximum loss at points 120 and 122, which correspond to inter-pixel regions 110B and 110A, respectively. As is also illustrated at points 124, 126 and 128, the respective insertion losses associated with the pixel elements 108A, 108B and 108C is less than the insertion loss associated with the inter-pixel regions 110A and 110B.

In many applications, the difference in the optical properties between a center of a pixel element and an inter-pixel region is not critical and inter-pixels regions can simply be masked with an absorbing material. However, in a number of applications, it is desirable for the inter-pixel regions to have optical properties, which are similar to that of the pixel element centers. For example, when channels are banded to produce a continuous spectrum it is desirable for the inter-pixel regions of an SLM to have the same characteristics as the pixel element centers.

Thus, a spatial light modulator (SLM) whose inter-pixel regions have optical properties that are substantially similar to the optical properties of pixel element centers is desired.

SUMMARY OF THE INVENTION

One embodiment of the present invention is directed to a reflective spatial light modulator (SLM) that includes a first substrate, a second substrate and an electro-optic material positioned between the first and second substrates. According to one embodiment, the first substrate includes a continuous reflective ground layer that acts as a first electrode and the second substrate is transparent and includes a pixel layer having a plurality of pixel elements formed in a pattern. The pixel elements are formed of a transparent conductive material and are separated by inter-pixel regions formed of a non-conductive material. A transmissivity of the electro-optic material in a vicinity of each of the plurality of pixel elements is controlled by a potential difference applied between the first electrode and a respective one of the pixel elements.

According to another embodiment of the present invention, a reflective SLM includes an optically transparent first substrate, a second substrate, an electro-optic material positioned between the first and second substrates and a dielectric mirror. The first substrate includes a ground layer that acts as a continuous transparent first electrode. The second substrate includes a pixel layer having a plurality of pixel elements formed in a pattern. The pixel elements are formed of a conductive material and are separated by inter-pixel regions formed of a non-conductive material. The transmissivity of the electro-optic material in a vicinity of each of the plurality of pixel elements is controlled by a potential difference applied between the first electrode and a respective one of the pixel elements. The dielectric mirror is positioned between the pixel layer and the electro-optic material.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENT(S)

A number of attributes are useful in evaluating the inter-pixel performance of various spatial light modulator (SLM) designs. When an SLM is employed in a banding-type application, one can generally assume that it is desirable for neighboring pixels to have the same orientation and dimensions. A first attribute that is useful in evaluating the performance of an SLM design is minimum insertion loss ripple. Minimum insertion loss ripple is defined as the maximum deviation of the optical insertion loss as an optical beam passes from one pixel through an inter-pixel region and into a neighboring pixel, while both pixels are held at an appropriate voltage to achieve minimum insertion loss. Insertion loss (in dBs) is defined as follows:

$$\eta = 10\log\left(\frac{P_{OUT}}{P_{IN}}\right)$$

Figure 1:
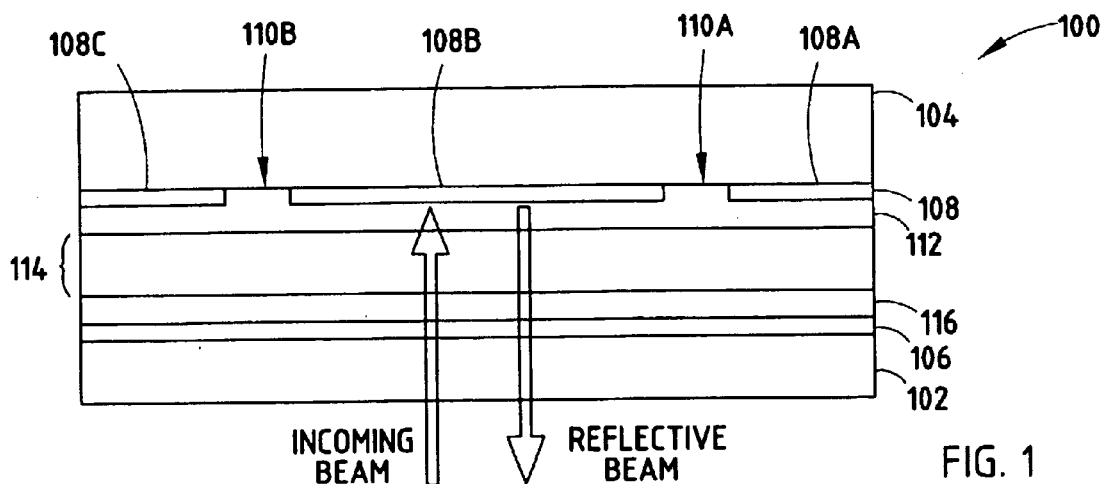
FIG. 1 is a partial cross-sectional view of an exemplary spatial light modulator (SLM), according to the prior art.
Figure 2:
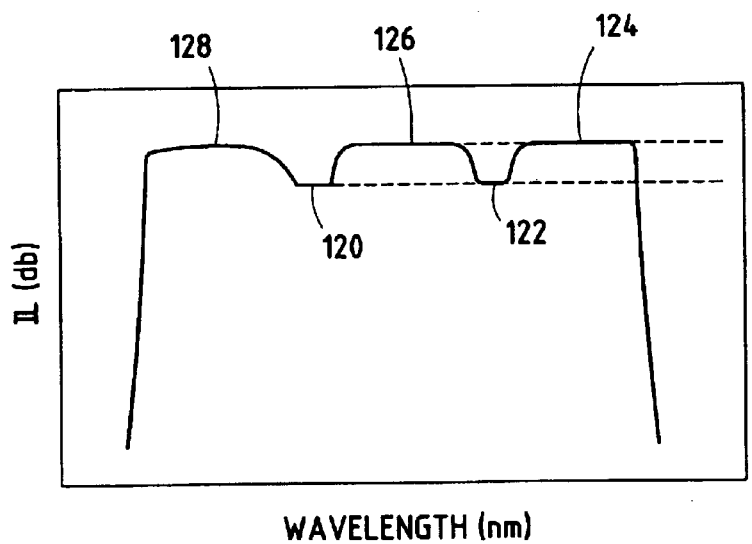
FIG. 2 is a graph depicting a typical variation in insertion loss between pixels and inter-pixel regions for the SLM of FIG. 1.

A typical insertion loss graph associated with a prior art SLM is illustrated in FIG. 2. In general, a useful SLM design should have a minimum insertion loss ripple less than 0.2 dB. A second attribute that is useful in evaluating an SLM design is insertion loss ripple at attenuation. Insertion loss ripple at attenuation is essentially defined the same as minimum insertion loss ripple, with the exception that the pixel voltages are set to achieve some moderate level of attenuation, e.g., typically 10 to 15 dB below the minimum insertion loss. A third attribute that is useful in evaluating SLM designs is inter-pixel extinction, which is defined as the insertion loss in the inter-pixel region when the neighboring pixel voltages are set to achieve maximum insertion loss. In a general application, the inter-pixel extinction should not degrade below some minimum limit value, e.g., 35 to 40 dB. It should be appreciated that the present invention is generally applicable to reflective SLMs of various cell types, such as, electrically controlled birefringence (ECB), vertically aligned nematic (VAN) and mixed twist nematic (MTN) liquid crystal (LC) cells, among other LC cells.

According to the present invention, a first embodiment, as described herein, reduces a reflection variation between a center of an inter-pixel region through the implementation of a reflective ground layer, e.g., made of gold, formed on a first substrate, e.g., a fused silica substrate, to act as a continuous first electrode. In this embodiment, a transparent second substrate, e.g., a fused silica substrate, includes a pixel layer having a number of discrete pixel elements, formed in a pattern, with each pixel element acting as a separate electrode. The pixel elements are formed of a transparent conductive material, e.g., indium tin oxide (ITO), and are separated by inter-pixel regions formed of a non-conductive material. An electro-optical material, e.g., a liquid crystal (LC) film, is positioned between the first and second substrates and the transmissivity of the electro-optic material in a vicinity of each of the plurality of pixel elements is controlled by a potential difference applied between the first electrode and a respective one of the pixel elements.

Figure 3:
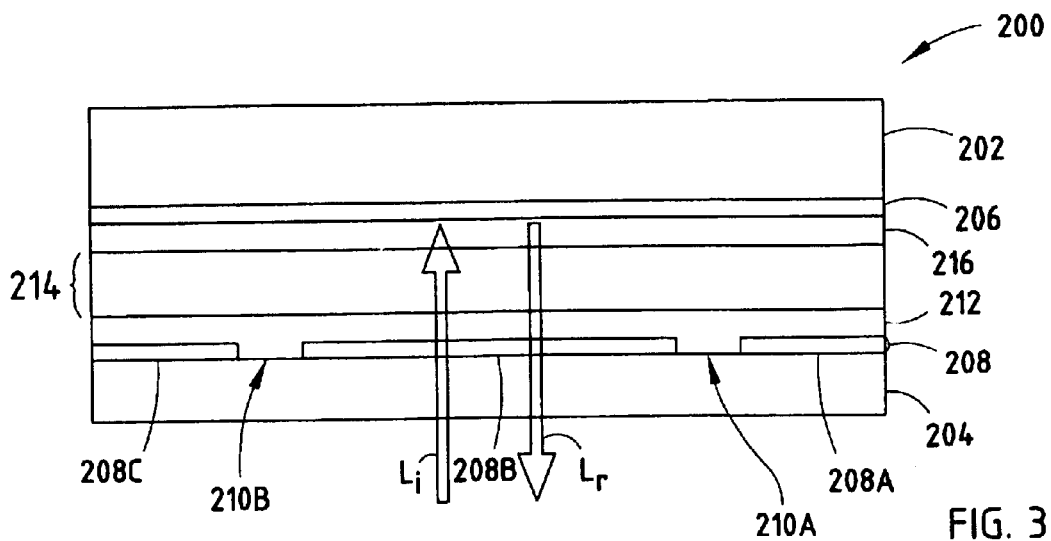
FIG. 3 is a partial cross-sectional view of an SLM, according to one embodiment of the present invention.
Figure 5:
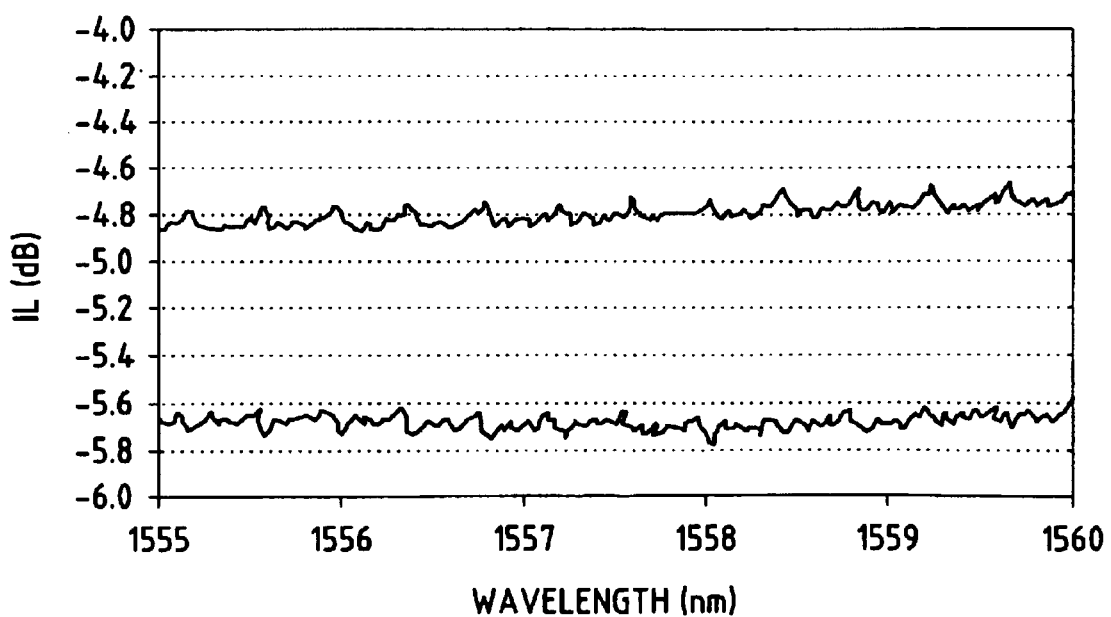
FIG. 5 is a graph depicting the insertion loss as a function of wavelength for the SLM of FIG. 3 at a minimum insertion loss level and with an attenuation of 1 dB below the minimum insertion loss level.

A transparent electrode may be constructed of a number of different materials, e.g., indium tin oxide (ITO) or $SnO_x$, and the reflective ground layer may be formed with a variety of metals, such as, gold, aluminum or an aluminum/copper alloy. As the reflection from the reflective ground layer is continuous, the insertion loss variation is dominated by the higher transmission in the inter-pixel region, due to the absence of the transparent electrode in the inter-pixel region. As is shown in the exemplary graph of FIG. 5, the variation in insertion loss of an inter-pixel region of a reflective SLM 200, constructed according to FIG. 3, is lowered to a relatively small value, e.g., made less than 0.2 dB, both at minimum insertion loss and at a 1 dB attenuation level below the minimum insertion loss level. It should be appreciated that the components of the SLMs depicted herein are not to scale.

FIG. 3 depicts a partial cross-section of the reflective SLM 200 constructed according to one embodiment of the present invention, which includes a first substrate 202, which has a reflective ground layer 206 that acts as a continuous first electrode and an optically transparent second substrate 204, which includes a pixel layer 208 having a plurality of pixel elements 208A, 208B and 208C formed in a pattern with each pixel element acting as a separate optically transparent electrode. The pixel elements 208A, 208B and 208C are formed of a transparent conductive material, e.g., ITO, and are separated by inter-pixel regions 210A and 210B, formed of a non-conductive material. A transparent alignment layer 212 is formed over the layer 208 and a transparent alignment layer 216 is formed over the first electrode 206. The alignment layers 212 and 216 are used to align LC molecules of electro-optic material 214.

The electro-optic material 214, e.g., a liquid crystal (LC) film, is positioned between the first substrate 202 and the second substrate 204. The transmissivity of the electro-optic material 214 in a vicinity of each of the plurality of pixel elements 208A–208C is controlled by a potential difference applied between the first electrode and a respective one of the pixel elements. The transparent conductive material that is utilized to form the pixel layer 208 may take a variety of forms, such as, indium tin oxide (ITO), and the ground layer may be made of a variety of reflective metals, e.g., gold, aluminum and an aluminum/copper alloy.

Figure 4:
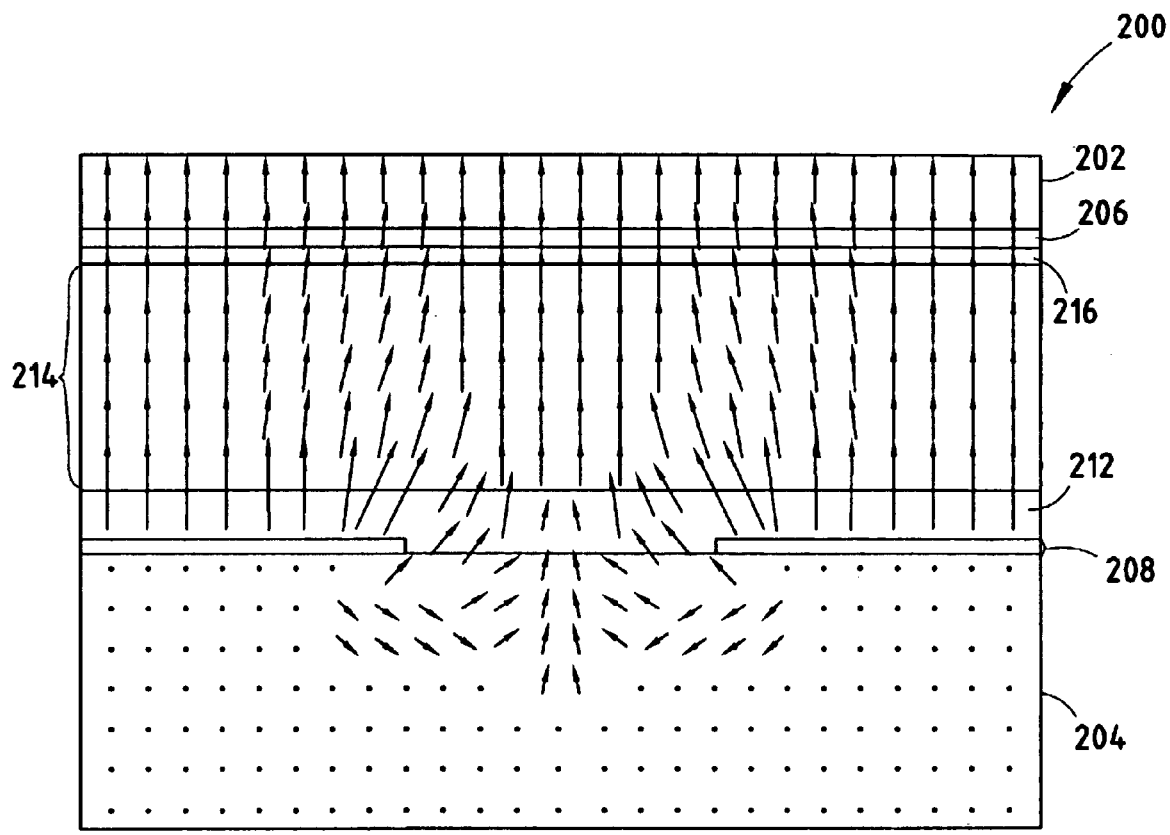
FIG. 4 is a partial cross-sectional view that illustrates a strength and direction of an electric field within the SLM of FIG. 3.
Figure 6:
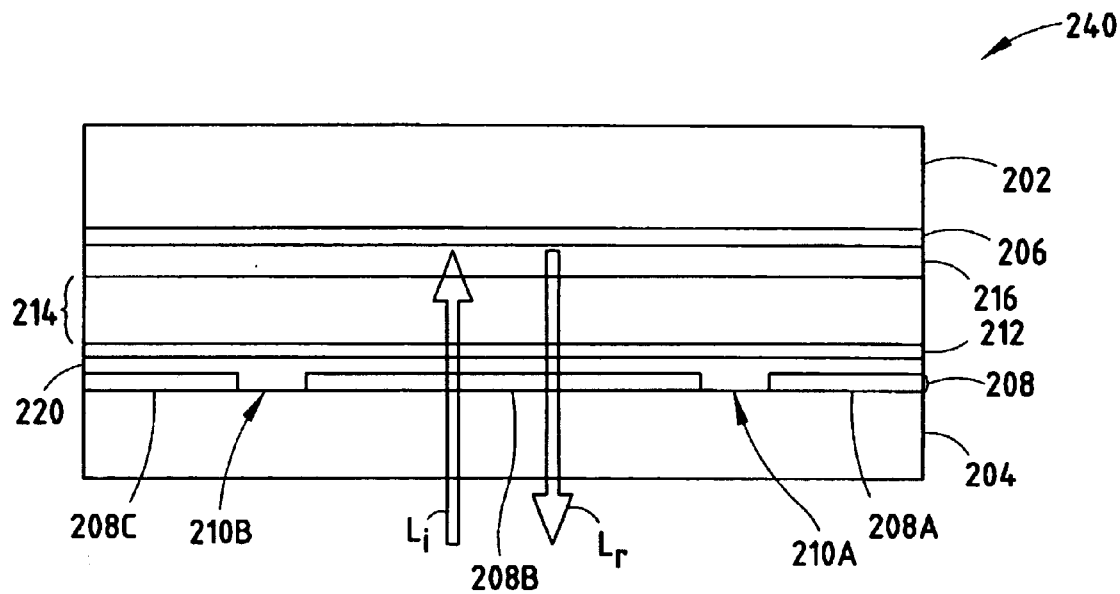
FIG. 6 is a cross-sectional view of an SLM, according to another embodiment of the present invention.
Figure 7:
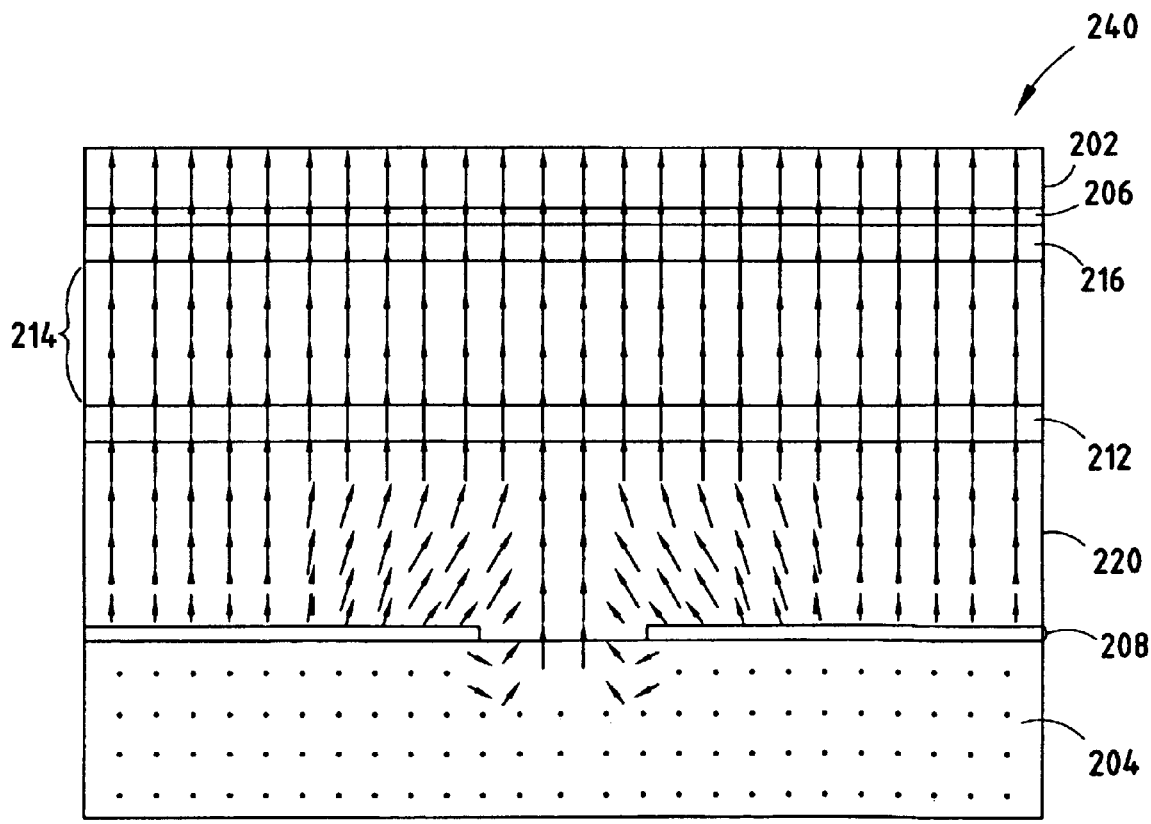
FIG. 7 is a cross-sectional view of the SLM of FIG. 6 illustrating a strength and direction of an electric field within the SLM of FIG. 6.

FIG. 4 is an exemplary electric field diagram that depicts a strength and direction of an electric field in the components of the SLM 200 of FIG. 3. While insertion loss is reduced in the SLM 200 of FIG. 3, the SLM 200 still experiences somewhat undesirable levels of ripple at attenuation and extinction, due to fringing electric fields near the substrate 204. However, as is shown in FIG. 6, ripple at attenuation and extinction can be improved by adding a dielectric layer 220, which is optically transparent, between the pixel layer 208 and the electro-optic material 214. The dielectric layer 220 may be of a variety of different dielectric materials, e.g., $SiO_2$ or $Al_2O_3$, and may range in thickness from about 0.5 to 3 microns. In this manner, the fringing electric fields that contribute to a difference in optical properties for the inter-pixel regions and the center of the pixel elements may be confined inside the dielectric layer 220 and, in this manner, prevent the fringing electric fields from adversely affecting the operation of SLM 240. FIG. 7 depicts a strength and direction of an electric field within the components of the SLM 240.

Figure 8:
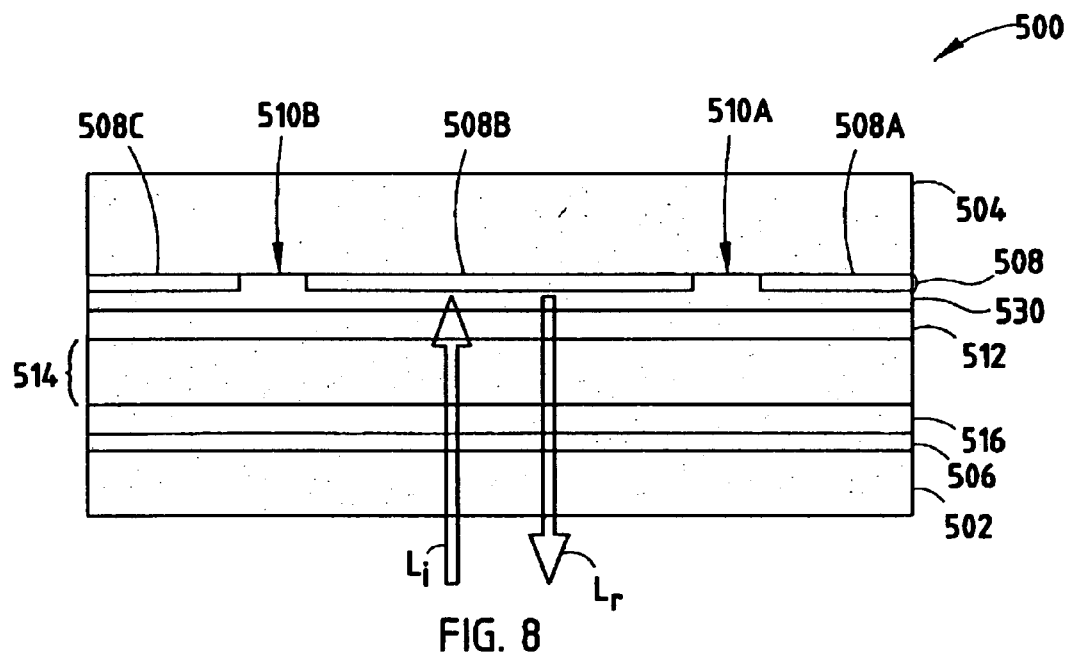
FIG. 8 is a partial cross-sectional view of an SLM, according to yet another embodiment of the present invention.

FIG. 8 depicts a spatial light modulator (SLM) 500, according to another embodiment of the present invention. The SLM 500 includes a first substrate 502 that is an optically transparent substrate, e.g., made of a fused silica, that has a ground layer 506 formed thereon that acts as a continuous transparent first electrode. An optically transparent alignment layer 516 is formed all on the first electrode 506 and is utilized in conjunction with an optically transparent alignment layer 512, formed on a second substrate 504, to align the first substrate 502 with the second substrate 504. The second substrate 504 includes a pixel layer 508 formed thereon that has a plurality of pixel elements 508A, 508B and 508C, formed in a pattern, with each of the pixel elements 508A–508C acting as a discrete electrode. The pixel elements 508A–508C are formed of a conductive material and are separated by inter-pixel regions 510A and 510B formed of a non-conductive material, e.g., $SiO_2$.

Figure 9:
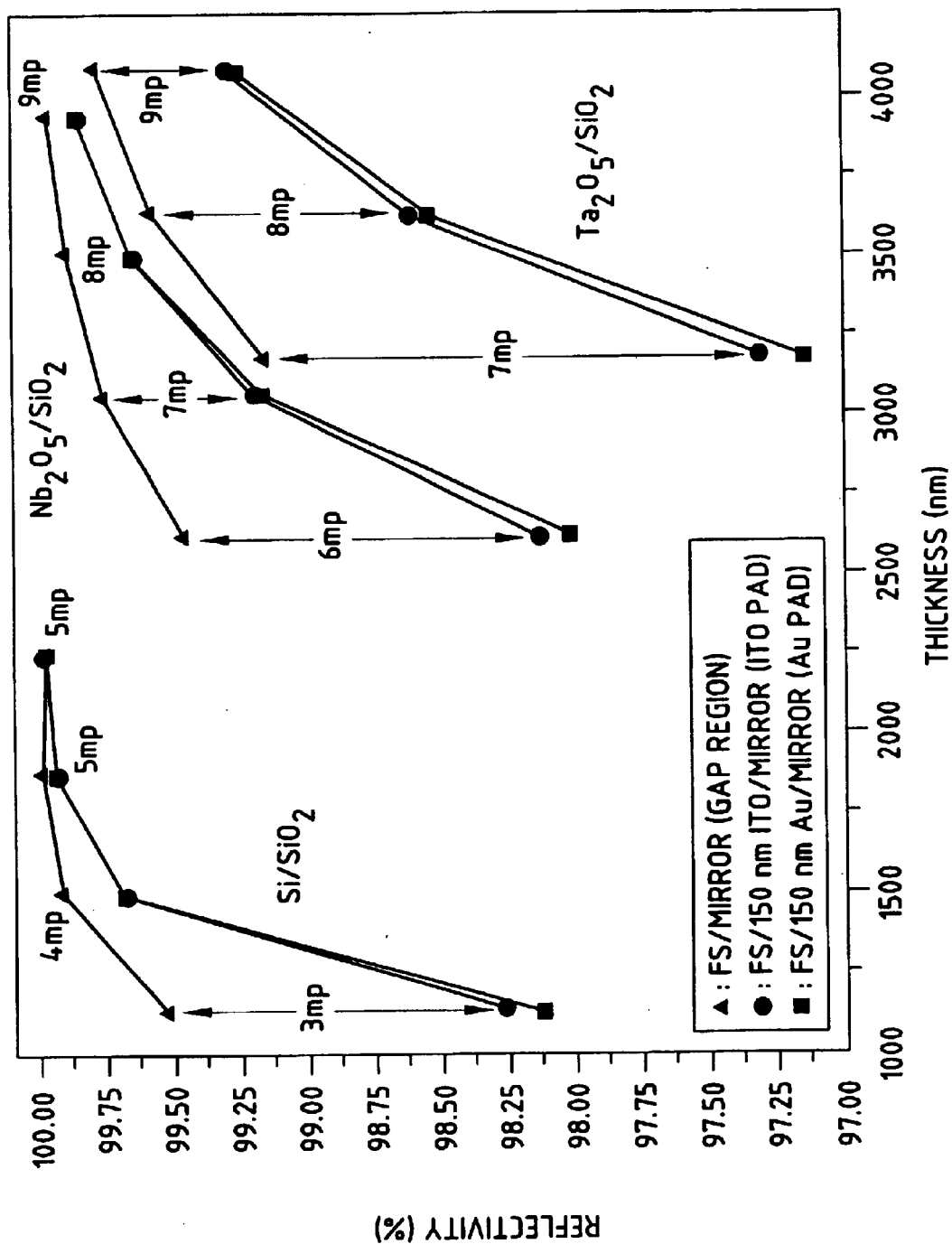
FIG. 9 is a graph illustrating the reflectivity of a number of different dielectric mirrors, implemented within the SLM of FIG. 8, as a function of thickness and material-type for a number of dielectric mirrors.

A dielectric mirror 530 is formed on the pixel layer 508 and extends into the inter-pixel regions 510A and 510B and the alignment layer 512 is formed on the dielectric mirror 530. An electro-optic material 514 is positioned between the first substrate 502 and the second substrate 504. The electro-optic material 514, in a vicinity of each of the plurality of pixel elements 508A–508C, is controlled by a potential difference applied between the first electrode 506 and the pixel elements 508A–508C. The electro-optic material 514 may be of a wide variety of electro-optic materials, such as, a liquid crystal (LC) film. The dielectric mirror 530 may be formed of a variety of high-index and low-index materials, e.g., $Si/SiO_2$, $NB_2O_5/SiO_2$ and $TA_2O_5/SiO_2$. FIG. 9 depicts the reflectivity of a number of material pairs made of different materials as a function of a total thickness, i.e., a number of material pairs, of the dielectric mirror 530.

Figure 12:
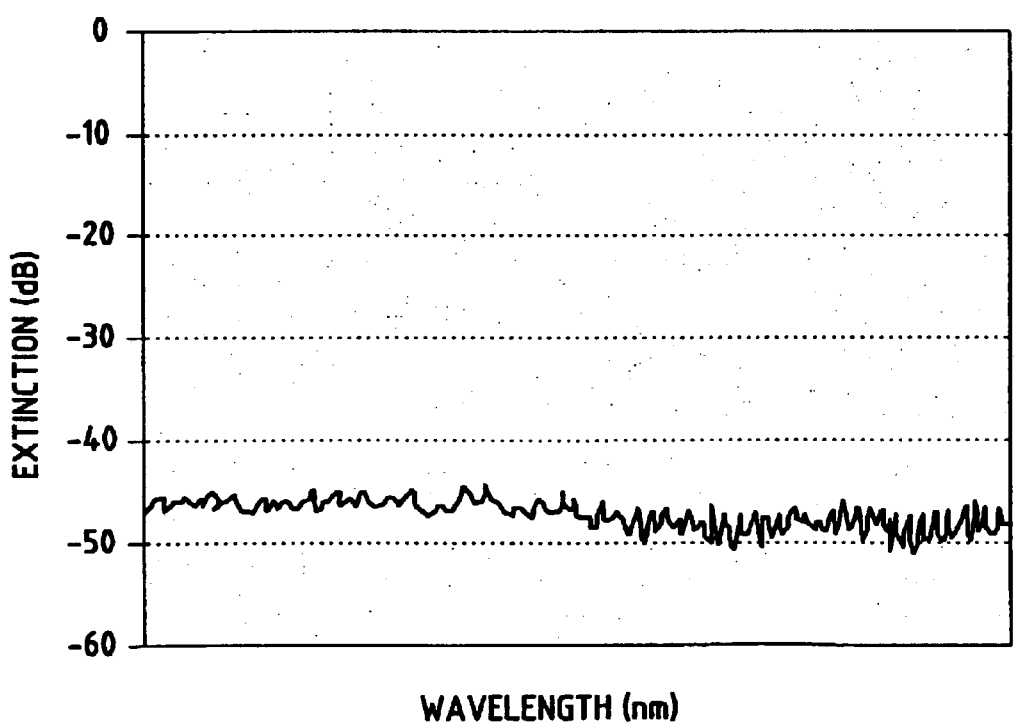
FIG. 12 is a graph depicting the extinction as a function of wavelength for the SLM of FIG. 8.
Figure 10:
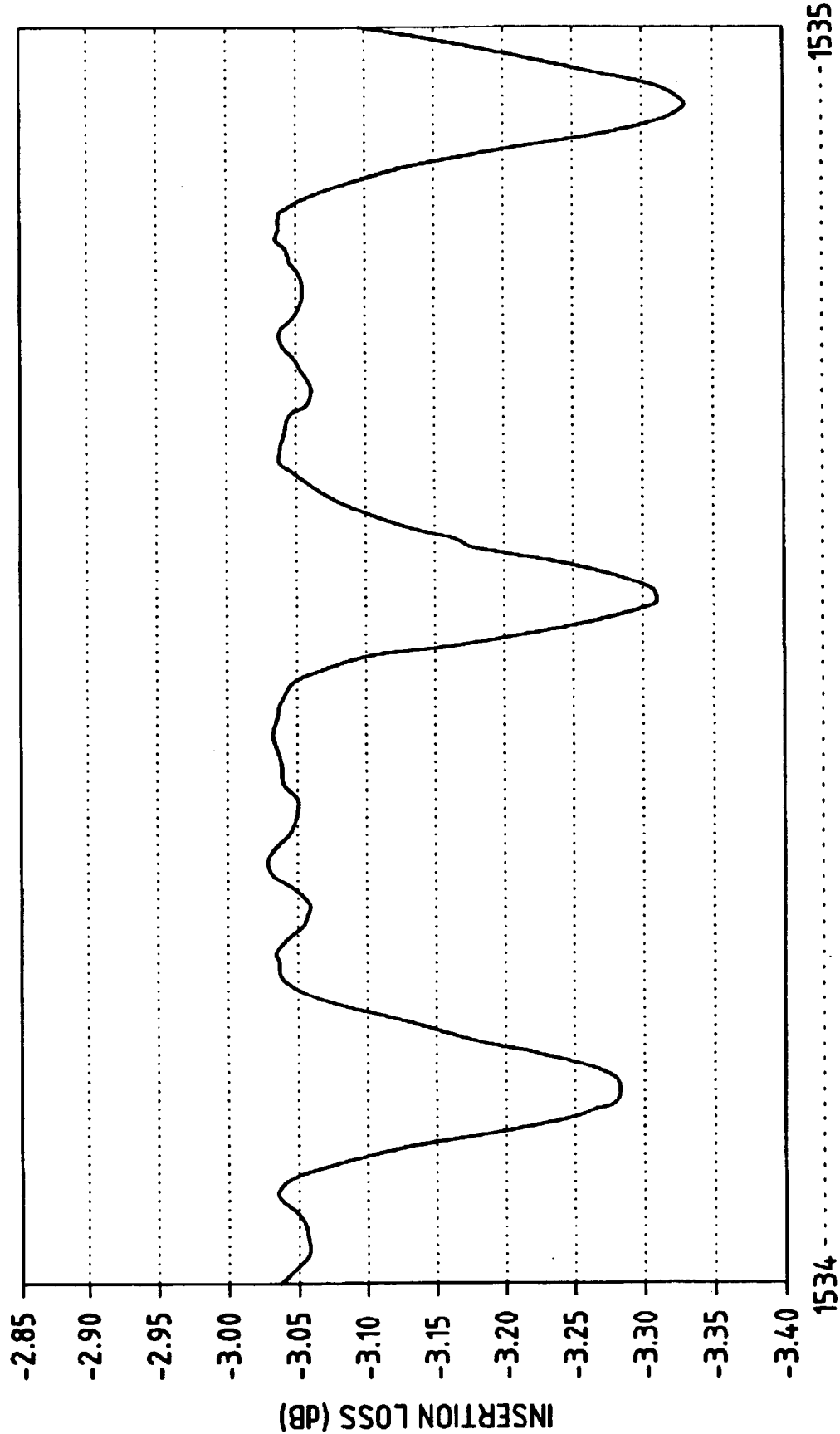
FIG. 10 is a graph depicting the insertion loss ripple as a function of wavelength for the SLM of FIG. 8.
Figure 11:
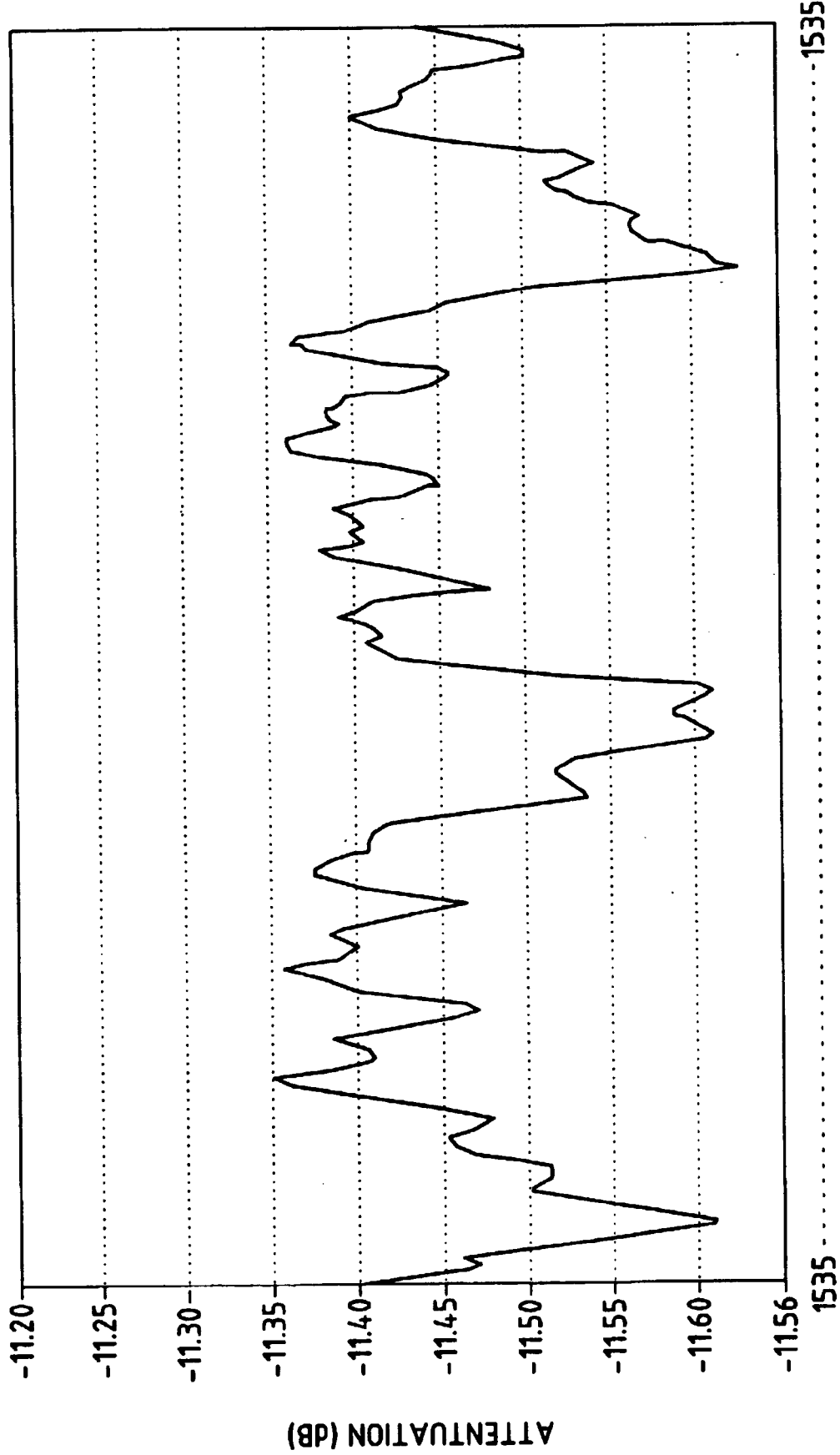
FIG. 11 is a graph depicting the ripple at attenuation for the SLM of FIG. 8.

As is shown in FIG. 9, the reflectivity of the dielectric mirror 530 is enhanced when the pixel elements 508A–508C are formed with a non-transparent conductor, such as gold. However, the reflectivity of the inter-pixel regions 510A and 510B are more closely matched when the pixel elements 508A–508C are formed with an optically transparent conductor, such as ITO. FIG. 10 is a graph illustrating the insertion loss ripple for three pixel elements and two inter-pixel regions (i.e., from a first pixel to a first inter-pixel region to a second pixel to a second inter-pixel region to a third pixel), which corresponds to three channels for the SLM 500. FIG. 11 is a graph showing the ripple at attenuation as a function of pixel elements and inter-pixel regions for the SLM 500 of FIG. 8 and FIG. 12 is a graph depicting the extinction as a function of inter-pixel regions and pixel elements for the SLM 500 of FIG. 8.

Figure 13:
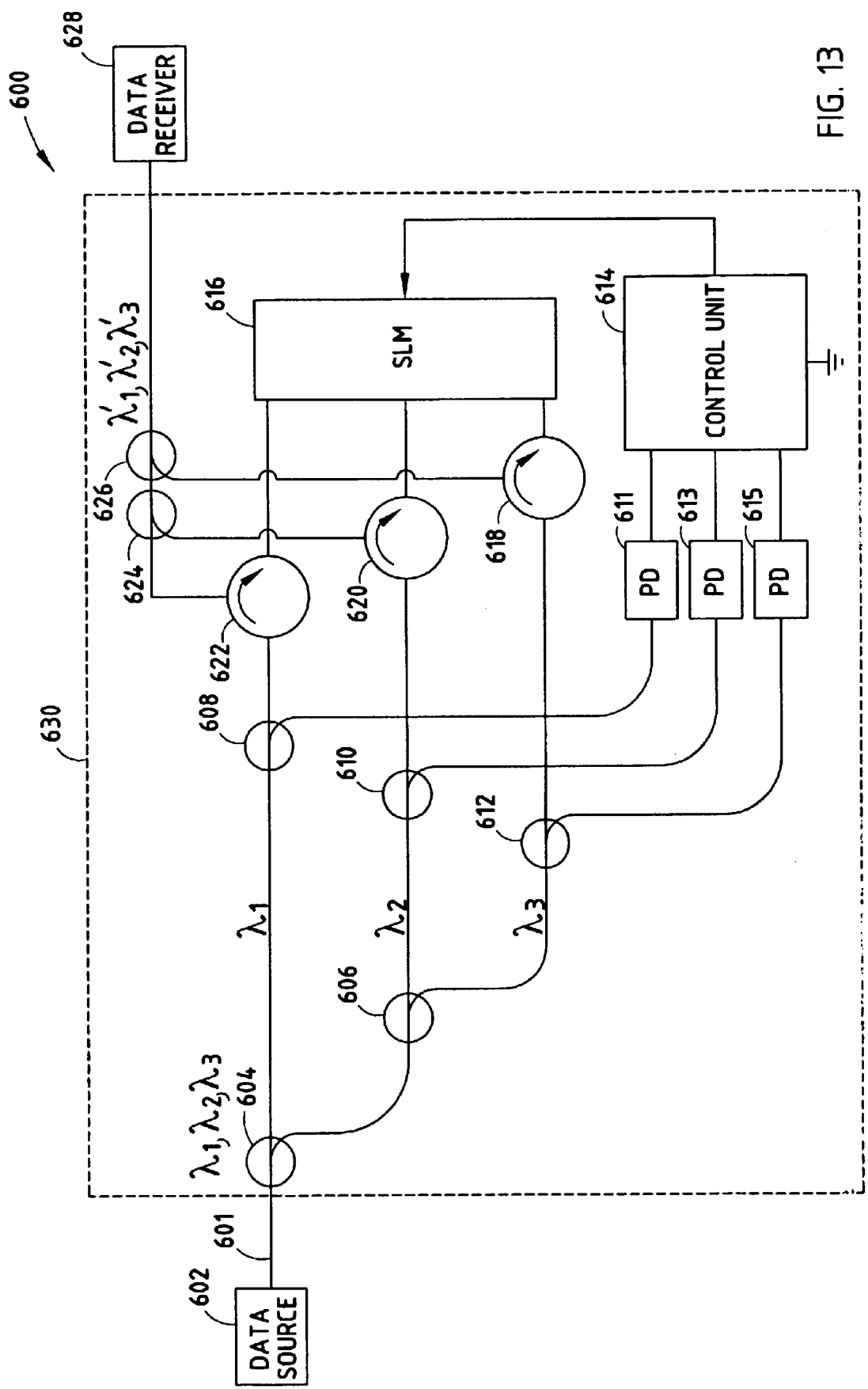
FIG. 13 is an exemplary optical system including an exemplary dynamic spectrum equalizer (DSE) that incorporates a SLM constructed according to one of FIGS. 3, 6 and 8.

FIG. 13 depicts an exemplary optical system 600 that includes a data source 602 that is coupled to a dynamic spectrum equalizer (DSE) 630, which is coupled to an optical data receiver 628. The DSE 630 receives a wavelength division multiplexed (WDM) signal including a number of data channels, only three of which, $\lambda 1$, $\lambda 2$, $\lambda 3$, are shown in FIG. 13. The WDM signals are provided by the data source 602 to a waveguide 601, which is coupled to an input of a wavelength selective coupler 604, whose first output is coupled to an input of a coupler 608, e.g., a 98.2/1.8 percent coupler, and whose second output is coupled to an input of a second wavelength selective coupler 606. As is shown, the coupler 604 passes the wavelength $\lambda_1$ to an input of the coupler 608 and provides the wavelengths $\lambda_2$ and $\lambda_3$ to the input of the coupler 606. The coupler 606 provides a second wavelength $\lambda_2$ at a first output, which is coupled to an input of coupler 610, and a third wavelength $\lambda_3$ at its second output, which is coupled to an input of coupler 612.

A first output of the coupler 608 is coupled to a first port of a circulator 622, whose second port is coupled to a waveguide that directs the first wavelength $\lambda_1$ to a first pixel of a reflective spatial light modulator (SLM) 616. A second output of the coupler 608 is coupled to an input of a photodiode 611, whose output is coupled to an input of a control unit 614. A first output of the coupler 610, e.g., a 98.2/1.8 percent coupler, is coupled to a first port of a circulator 620, whose second port is coupled to a waveguide, which directs the second wavelength $\lambda_2$ to a second pixel located in the SLM 616. A second output of the coupler 610 is coupled to an input of a photodiode 613, whose output is coupled to a second input of the control unit 614. A first output of the coupler 612, e.g., a 98.2/1.8 percent coupler, is coupled to a first port of a circulator 618, whose second port is coupled to a waveguide that directs the third wavelength $\lambda_3$ to a third pixel located in the SLM 616. A second output of the coupler 612 is coupled to an input of a photodiode 615, whose output is coupled to a third input of the control unit 614.

Outputs of the control unit 614 are coupled to the SLM 616 and the control unit 614 is programmed to control the transmissivity of the pixels of the SLM responsive to the level of the output signals provided at the first, second and third inputs, by the photodiodes 611, 613 and 615, respectively. Thus, the control unit 614 determines the levels of the first, second and third signals $\lambda_1$, $\lambda_2$ and $\lambda_3$ and attenuate one or more of the signals so as to equalize or attenuate the channels, when desired or necessary. An equalized first channel $\lambda_1'$ is reflected to the second port of the circulator 622 and exits a third port of the circulator 622, which is coupled to an input of a directional coupler 624. A second equalized signal $\lambda_2'$ is reflected to the second port of the circulator 620 and is routed to the third port of the circulator 620, which is coupled to a second input of the directional coupler 624. An output of the directional coupler 624 is coupled to a first input of directional coupler 626 and a second input of the coupler 626 is coupled to a third port of the circulator 618, which receives an equalized third channel $\lambda_3'$ signal reflected to the second port of the circulator 618 from the third pixel of the SLM 616. The output of the coupler 626 is coupled to an input of the data receiver 628 and provides the equalized first, second and third channels $\lambda_1'$, $\lambda_2'$ and $\lambda_3'$ to the data receiver 628.

Accordingly, a number of reflective spatial light modulators (SLMs) have been described herein, which provide improved inter-pixel performance over prior reflective SLMs. These SLMs may be advantageously implemented within applications, which require banding of pixel elements, such as when the SLMs are implemented within a dynamic spectrum equalizer (DSE) of an optical system.

It will become apparent to those skilled in the art that various modifications to the preferred embodiment of the invention as described herein can be made without departing from the spirit or scope of the invention as defined by the appended claims.

The invention claimed is:

1. A reflective spatial light modulator (SLM), comprising:
   a first substrate including a reflective ground layer that acts as a continuous first electrode;
   an optically transparent second substrate including a pixel layer having a plurality of pixel elements formed in a pattern, wherein the pixel elements are formed of a transparent conductive material and are separated by inter-pixel regions formed of a non-conductive material; and
   an electro-optic material positioned between the first and second substrates, wherein a transmissivity of the electro-optic material in a vicinity of each of the plurality of pixel elements is controlled by a potential difference applied between the first electrode and a respective one of the pixel elements.

2. The SLM of claim 1, wherein the transparent conductive material is indium tin oxide (ITO) and the ground layer is made of gold.

3. The SLM of claim 1, wherein the transparent conductive material is indium tin oxide (ITO).

4. The SLM of claim 1, wherein the ground layer is made of at least one of aluminum and copper.

5. The SLM of claim 1, further including:
   an optically transparent dielectric layer positioned between the pixel layer and the electro-optic material.

6. The SLM of claim 5, wherein the transparent dielectric layer is one of $SiO_2$ and $Al_2O_3$.

7. The SLM of claim 5, wherein the transparent dielectric layer is between about 0.5 and 3.0 microns.

8. The SLM of claim 1, wherein the electro-optic material is a liquid crystal film.

9. A reflective liquid crystal spatial light modulator (SLM), comprising:
   an optically transparent first substrate including a ground layer that acts as a continuous transparent first electrode;
   a second substrate including a pixel layer having a plurality of pixel elements formed in a pattern, wherein the pixel elements are formed of a conductive material and are separated by inter-pixel regions formed of a non-conductive material;
   an electro-optic material positioned between the first and second substrates, wherein a transmissivity of the electro-optic material in a vicinity of each of the plurality of pixel elements is controlled by a potential difference applied between the first electrode and a respective one of the pixel elements; and
   a dielectric mirror positioned between the pixel layer and the electro-optic material.

10. The SLM of claim 9, wherein the first electrode and the pixel elements are made of indium tin oxide (ITO).

11. The SLM of claim 9, wherein the first electrode is made of indium tin oxide (ITO).

12. The SLM of claim 9, wherein the pixel elements are made of gold.

13. The SLM of claim 9, wherein the electro-optic material is a liquid crystal film.

14. A reflective spatial light modulator (SLM), comprising:
   a first substrate including a reflective ground layer that acts as a continuous first electrode;
   an optically transparent second substrate including a pixel layer having a plurality of pixel elements formed in a pattern, wherein the pixel elements are formed of a transparent conductive material and are separated by inter-pixel regions formed of a non-conductive material;
   an electro-optic material positioned between the first and second substrates, wherein a transmissivity of the electro-optic material in a vicinity of each of the plurality of pixel elements is controlled by a potential difference applied between the first electrode and a respective one of the pixel elements; and
   an optically transparent dielectric layer positioned between the pixel layer and the electro-optic material, and wherein the optically transparent dielectric layer is formed on the second substrate.

15. The SLM of claim 14, wherein the transparent conductive material is indium tin oxide (ITO) and the ground layer is made of gold.

16. The SLM of claim 14, wherein the transparent conductive material is indium tin oxide (ITO).

17. The SLM of claim 14, wherein the ground layer includes at least one of aluminum and copper.

18. The SLM of claim 14, wherein the transparent dielectric layer is one of $SiO_2$ and $Al_2O_3$.

19. The SLM of claim 14, wherein the transparent dielectric layer is between about 0.5 and 3.0 microns.

20. The SLM of claim 14, wherein the electro-optic material is a liquid crystal film.

21. An optical system, comprising:
   an optical data source for providing a wavelength division multiplexed (WDM) signal including a plurality of data channels;
   an optical data receiver; and
   a dynamic spectrum equalizer coupled to the optical data source and the optical data receiver, the dynamic spectrum equalizer including:
      a reflective spatial light modulator (SLM), including:
         a first substrate including a reflective ground layer that acts as a continuous first electrode;
         an optically transparent second substrate including a pixel layer having a plurality of pixel elements formed in a pattern, wherein the pixel elements are formed of a transparent conductive material and are separated by inter-pixel regions formed of a non-conductive material; and
         an electro-optic material positioned between the first and second substrates, wherein a transmissivity of the electro-optic material in a vicinity of each of the plurality of pixel elements is controlled by a potential difference applied between the first electrode and a respective one of the pixel elements, and wherein each of the data channels of the WDM signal are directed to a different one of the pixel elements; and
      a control unit coupled to the SLM, the control unit receiving a portion of each of the data channels of the WDM signal and responsive to a power level of each of the data channels controlling the potential difference applied between the first electrode and each of the pixel elements to equalize the power levels of the data channels so as to provide an equalized WDM signal to the data receiver.

22. The system of claim 21, wherein the transparent conductive material is indium tin oxide (ITO) and the ground layer is made of gold.

23. The system of claim 21, further including:
an optically transparent dielectric layer positioned between the pixel layer and the electro-optic material.

24. An optical system, comprising:
an optical data source providing a wavelength division multiplexed (WDM) signal including a plurality of data channels;
an optical data receiver; and
a dynamic spectrum equalizer coupled to the optical data source and the optical data receiver, the dynamic spectrum equalizer including:
a reflective spatial light modulator (SLM), including:
an optically transparent first substrate including a ground layer that acts as a continuous transparent first electrode;
a second substrate including a pixel layer having a plurality of pixel elements formed in a pattern, wherein the pixel elements are formed of a conductive material and are separated by inter-pixel regions formed of a non-conductive material;
an electro-optic material positioned between the first and second substrates, wherein a transmissivity of the electro-optic material in a vicinity of each of the plurality of pixel elements is controlled by a potential difference applied between the first electrode and a respective one of the pixel elements, and wherein each of the data channels of the WDM signal are directed to a different one of the pixel elements; and
a dielectric mirror positioned between the pixel layer and the electro-optic material; and
a control unit coupled to the SLM, the control unit receiving a portion of each of the data channels of the WDM signal and responsive to a power level of each of the data channels controlling the potential difference applied between the first electrode and each of the pixel elements to equalize the power levels of the data channels so as to provide an equalized WDM signal to the data receiver.

25. The system of claim 24, wherein the first electrode and the pixel elements are made of indium tin oxide (ITO).

26. The system of claim 24, wherein the first electrode is made of indium tin oxide (ITO) and the pixel elements are made of gold.

27. The system of claim 24, wherein the electro-optic material is a liquid crystal film.

* * * * *